(12) United States Patent
   Du

(10) Patent No.: US 12,599,111 B2
(45) Date of Patent: Apr. 14, 2026

(54) DEVICE FOR ROTATABLY THROWING PET FOOD

(71) Applicant: Mingju Du, Ankang (CN)

(72) Inventor: Mingju Du, Ankang (CN)

( * ) Notice: Subject to any disclaimer, the term of this patent is extended or adjusted under 35 U.S.C. 154(b) by 0 days.

(21) Appl. No.: 18/945,723

(22) Filed: Nov. 13, 2024

(65) Prior Publication Data

US 2026/0026467 A1     Jan. 29, 2026

(30) Foreign Application Priority Data

Jul. 24, 2024     (CN) .......................... 202421754481.0

(51) Int. Cl.
   *A01K 5/02* (2006.01)

(52) U.S. Cl.
   CPC .................................. *A01K 5/0241* (2013.01)

(58) Field of Classification Search
   CPC .. A01K 5/0241; A01K 5/0233; A01K 5/0258; A01K 5/0114; A01K 15/0201
   See application file for complete search history.

(56) References Cited

U.S. PATENT DOCUMENTS

| | | | | | |
|---|---|---|---|---|---|
| 3,130,707 | A | * | 4/1964 | Cleaveland | .......... A01K 5/0258 119/57.2 |
| 3,717,127 | A | * | 2/1973 | Porterfield | ........... A01K 5/0258 119/57.91 |
| 4,189,240 | A | * | 2/1980 | Scheppele | ............ A23N 17/007 366/186 |
| 4,248,175 | A | * | 2/1981 | Navarro | ............... A01K 5/0114 119/51.12 |
| 4,279,221 | A | * | 7/1981 | Arvizu | ................. A01K 5/0291 119/51.11 |
| 4,722,300 | A | * | 2/1988 | Walker | ................. A01K 5/0291 222/650 |
| 2005/0252457 | A1 | * | 11/2005 | Morosin | .............. A01K 5/0291 119/51.13 |
| 2006/0219187 | A1 | * | 10/2006 | Krishnamurthy | .... A01K 5/0275 119/719 |
| 2008/0202435 | A1 | * | 8/2008 | Nowacek | ............. A01K 5/0258 119/51.01 |
| 2014/0058559 | A1 | * | 2/2014 | Haynes | ................. A01K 15/02 119/57.7 |

(Continued)

FOREIGN PATENT DOCUMENTS

| | | | | | |
|---|---|---|---|---|---|
| CN | 115500275 | A | * | 12/2022 | ............... A01K 5/02 |
| CN | 117694262 | A | * | 3/2024 | ........... A01K 5/0114 |

*Primary Examiner* — Monica L Perry
(74) *Attorney, Agent, or Firm* — Nicholas Makridakis

(57)     ABSTRACT

Disclosed is a device for rotatably throwing pet food. The device includes a bottom plate, a groove is formed in an upper end face of the bottom plate, a push switch is arranged in the groove, a connecting ring is arranged behind the groove in the upper end face of the bottom plate, the connecting ring is detachably connected to a housing, and the housing is provided with a grain outlet. A rotating shaft is rotatably connected to the bottom plate, rotation of the rotating shaft is driven by a motor, both ends of the rotating shaft are exposed from upper and lower end faces of the bottom plate, a throwing assembly is arranged at an upper end of the rotating shaft, and the rotating shaft drives the throwing assembly to rotate so as to throw pet food in the housing out of the grain outlet.

8 Claims, 3 Drawing Sheets

(56) References Cited

U.S. PATENT DOCUMENTS

| | | | |
|---|---|---|---|
| 2015/0181837 A1* | 7/2015 | Cornwell | A01K 5/0291 |
| | | | 119/51.02 |
| 2016/0000036 A1* | 1/2016 | Cornwell, Jr. | A01K 5/0291 |
| | | | 119/51.11 |
| 2017/0251633 A1* | 9/2017 | Womble | A01K 5/02 |
| 2020/0100460 A1* | 4/2020 | Chen | A01K 5/0225 |
| 2020/0101594 A1* | 4/2020 | Chen | F16H 55/17 |
| 2020/0367469 A1* | 11/2020 | Zhu | A01K 5/0291 |
| 2023/0180714 A1* | 6/2023 | Wu | A01K 5/0142 |
| | | | 119/57 |

* cited by examiner

DEVICE FOR ROTATABLY THROWING PET FOOD

TECHNICAL FIELD

The present disclosure relates to the technical field of feeding devices, and particularly relates to a device for rotatably throwing pet food.

BACKGROUND

With the increasing popularity of pet keeping, more and more pet owners have placed feeding devices in their homes. The feeding devices in the prior art work by dispensing pet food at regular intervals, and have the following disadvantages:

1. Regular feeding cannot meet the pet's eating needs, and pet food exposed to the outside for a long time may be contaminated and spoiled.
2. Such feeding devices are incapable of achieving simple instruction training of the pets, with relatively limited functions.

SUMMARY

I. Technical Problems to be Solved

The technical problems to be solved by the present disclosure include that feeding devices in the prior art are incapable of feeding pets as needed according to their eating habits and achieving simple instruction training of the pets.

II. Technical Solution

In order to solve the above technical problems, the present disclosure provides the following technical solution: a device for rotatably throwing pet food includes a bottom plate, a groove is formed in an upper end face of the bottom plate, a push switch is arranged in the groove, a connecting ring is arranged behind the groove in the upper end face of the bottom plate, the connecting ring is detachably connected to a housing, and the housing is provided with a grain outlet; and a rotating shaft is rotatably connected to the bottom plate, rotation of the rotating shaft is driven by a motor, both ends of the rotating shaft are exposed from upper and lower end faces of the bottom plate, a throwing assembly is arranged at an upper end of the rotating shaft, and the rotating shaft drives the throwing assembly to rotate so as to throw pet food in the housing out of the grain outlet.

Further, the throwing assembly includes a connecting block, a connecting plate, and a tapping plate, where the connecting block is sleeved on the upper end of the rotating shaft, the connecting plate is symmetrically arranged against a side face of the connecting block, and the tapping plate is arranged against a side face of the connecting plate.

Further, an upper end face of the connecting block is provided with a connecting groove, a connecting screw is threadedly connected in the connecting groove, and the connecting screw is threadedly connected to the upper end of the rotating shaft.

Further, the tapping plate is arranged in an inclined manner, and upper ends of the tapping plates on a same side are arranged opposite to each other.

Further, a plug-in slot is arranged at a lower end of the rotating shaft, and an output end of the motor is snap-fitted into the plug-in slot.

Further, a lower end of the housing is threadedly connected to the connecting ring.

Further, the lower end of the housing is in snap-in connection with the connecting ring.

Further, the lower end of the housing is connected with the connecting ring by means of a positioning pin.

III. Beneficial Effects

Compared with the prior art, the present disclosure has the advantages as follows:

During training, when a pet presses the push switch, a controller controls the motor to rotate, the motor, through the rotating shaft, drives the throwing assembly to rotate, and the throwing assembly dispenses the pet food in the housing through a through hole and the grain outlet. This device is capable of feeding the pet as needed, and achieving simple instruction training of the pet.

Figure 1:
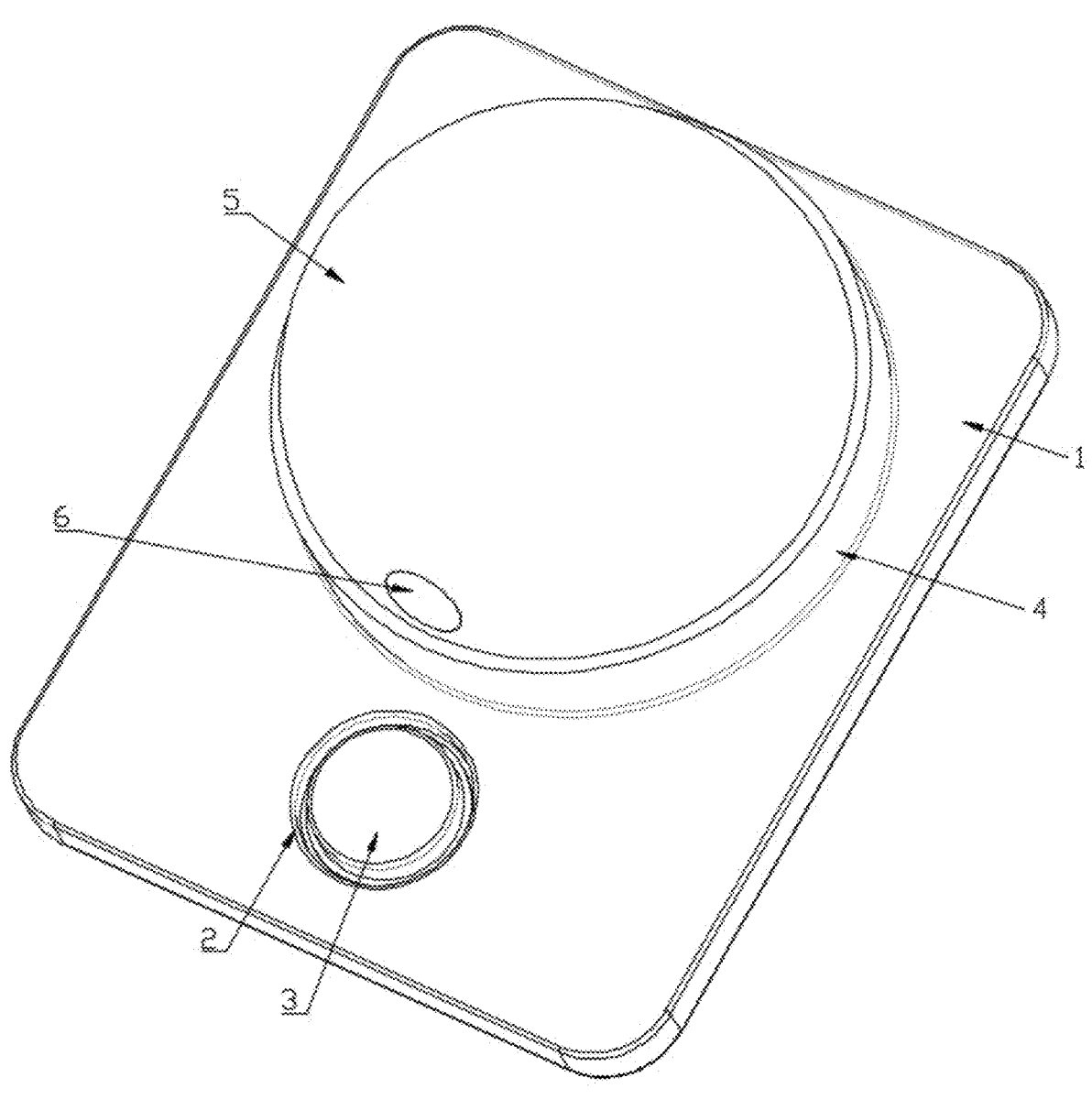
FIG. 1 is a structural schematic diagram I of the present disclosure.

Reference numerals in the FIGURES: 1. bottom plate, 2. groove, 3. push switch, 4. connecting ring, 5. housing, 6. grain outlet, 7. connecting block, 8. connecting plate, 9. tapping plate, 10. connecting screw, and 11. plug-in slot.

DETAILED DESCRIPTIONS OF THE EMBODIMENTS

The technical solutions in the examples of the present disclosure will be clearly and completely described. Apparently, the examples described are merely some rather than all of the examples of the present disclosure. Based on the examples of the present disclosure, all other examples obtained by those of ordinary skill in the art without making creative efforts shall fall within the protection scope of the present disclosure.

It should be noted that directional indications such as "upper", "lower", "left", "right", "front" and "rear" in the examples of the present disclosure are only for explaining the relative positional relationship, motion state and the like of each component at a specific posture as shown in the accompanying drawings, and when the specific posture changes, the directional indication will also accordingly change.

Moreover, the terms such as "first" and "second" and the like in the present disclosure are only used for descriptive purposes and should not be construed as indicating or implying relative importance or implicitly indicating the number of technical features indicated. Thus, a feature defined with "first" and "second" may explicitly or implicitly include at least one of the features. In the description of the present disclosure, "a plurality of" means at least two, such as two and three, unless expressly specified otherwise.

In order to make objectives, technical solutions and advantages of the present disclosure clearer, the present disclosure will be described in further detail below with reference to the accompanying drawings and examples. It should be understood that specific examples described herein are merely used to explain the present disclosure, and are not used to limit the present disclosure.

The present disclosure is further described in below with reference to the accompanying drawings of the specification.

Example 1

Figure 2:
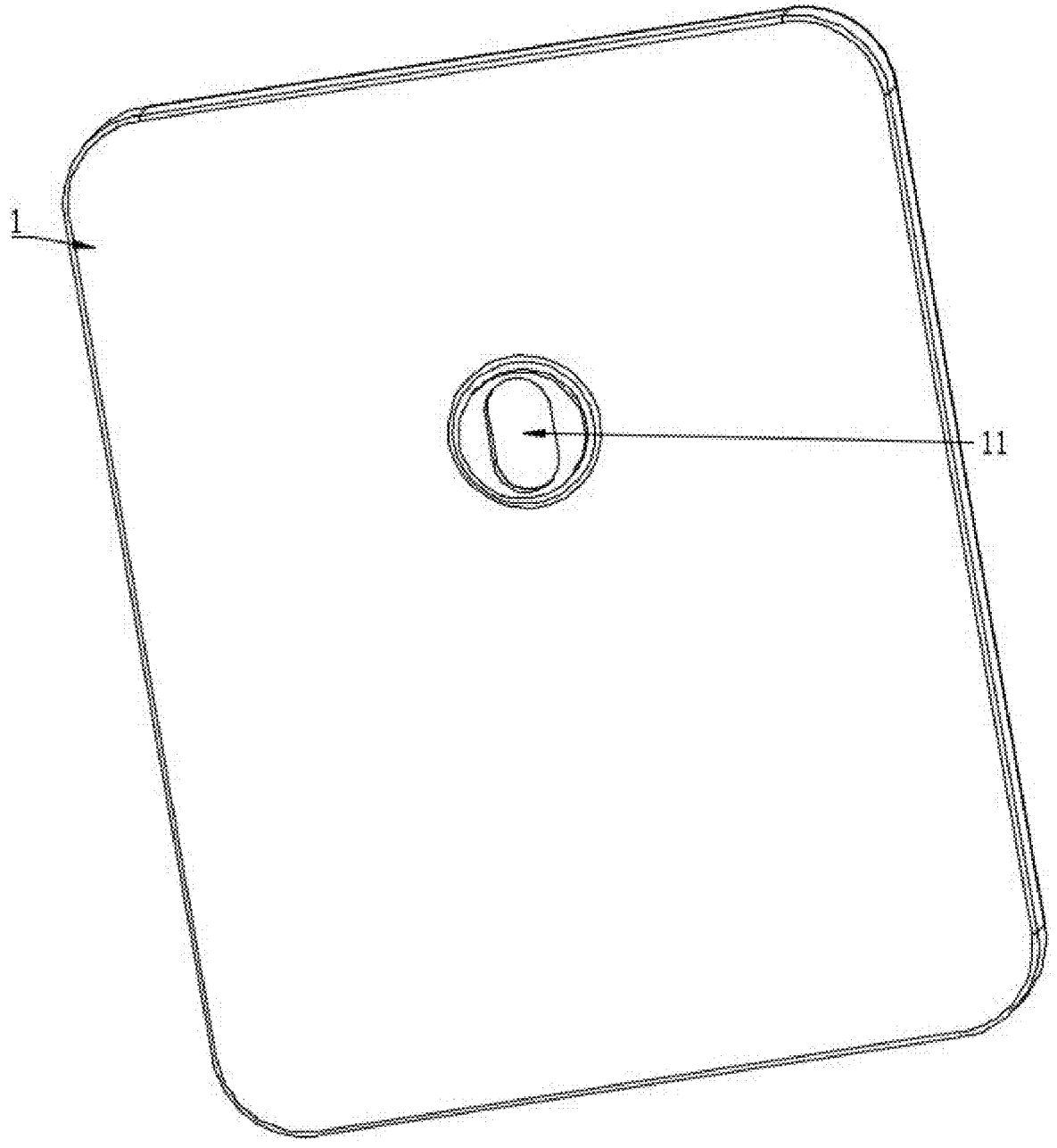
FIG. 2 is a structural schematic diagram II of the present disclosure.
Figure 3:
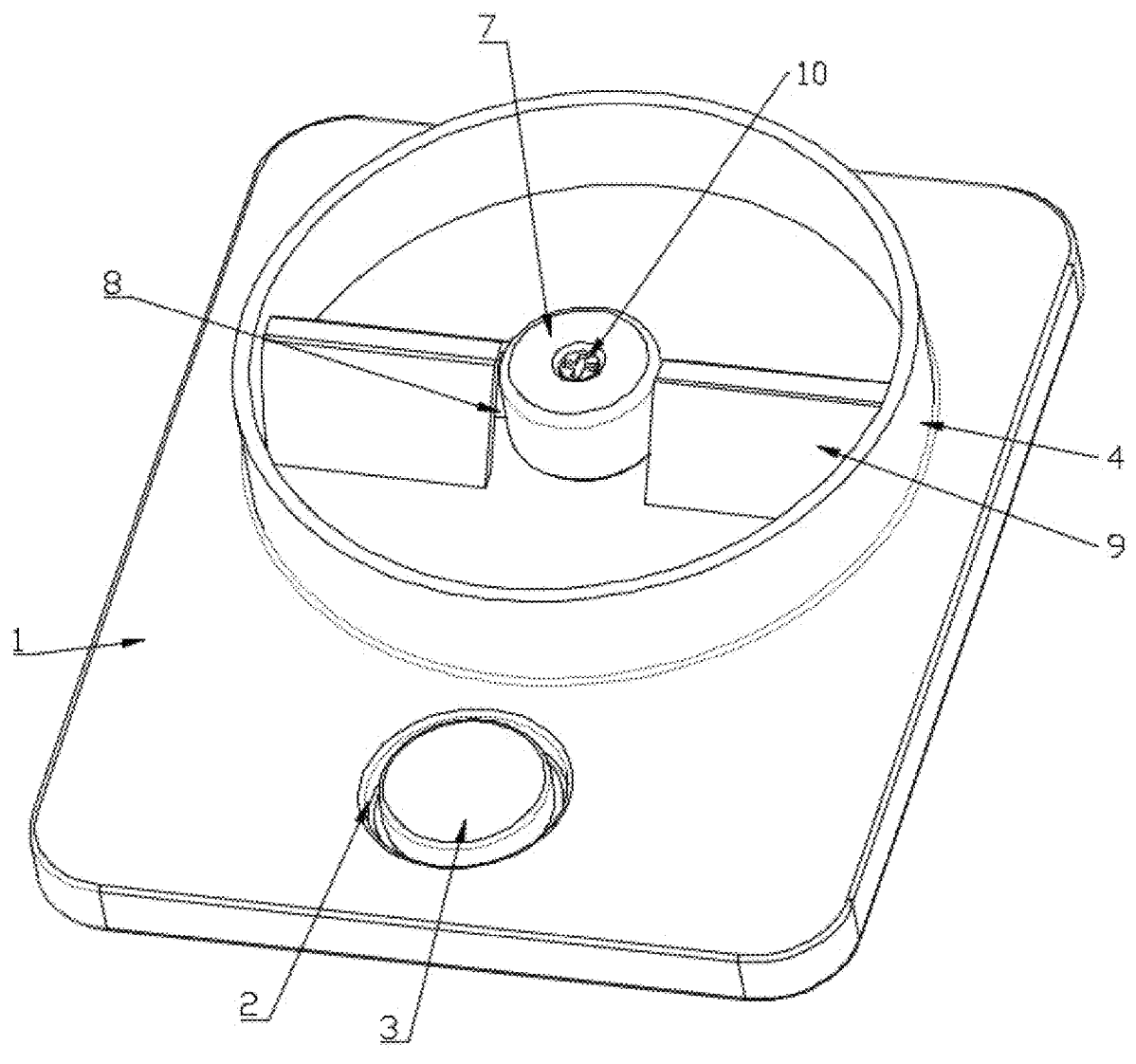
FIG. 3 is a structural schematic diagram of a bottom plate of the present disclosure.

With reference to FIGS. 1-3, a groove 2 is formed in an upper end face of the bottom plate 1, a push switch 3 is arranged in the groove 2, a connecting ring 4 is arranged behind the groove 2 in the upper end face of the bottom plate 1, the connecting ring 4 is detachably connected to a housing 5, and the housing 5 is provided with a grain outlet 6;

a rotating shaft is rotatably connected to the bottom plate 1, rotation of the rotating shaft is driven by a motor, both ends of the rotating shaft are exposed from upper and lower end faces of the bottom plate 1, a throwing assembly is arranged at an upper end of the rotating shaft, and the rotating shaft drives the throwing assembly to rotate so as to throw pet food in the housing 2 out of the grain outlet 6;

the throwing assembly includes a connecting block 7, a connecting plate 8, and a tapping plate 9, where the connecting block 7 is sleeved on the upper end of the rotating shaft, the connecting plate 8 is symmetrically arranged against a side face of the connecting block 7, and the tapping plate 9 is arranged against a side face of the connecting plate 8;

a plug-in slot 11 is arranged at a lower end of the rotating shaft, and an output end of the motor is snap-fitted into the plug-in slot 11; and the tapping plate 9 is arranged in an inclined manner, and upper ends of the tapping plates 9 on a same side are arranged opposite to each other.

When in use, the output end of the motor is snap-fitted into the plug-in slot 11. When a pet presses the push switch 3, the motor rotates for a certain period of time, and when the rotating shaft rotates, the rotating shaft, through the connecting block 7, drives the connecting plate 8 to rotate, and the connecting plate 8, through the tapping plate 9, throws the pet food in the housing 5 out of the grain outlet 6 of the housing 5. This device is capable of feeding the pet as needed, and achieving simple instruction training of the pet.

Example 2

With reference to FIGS. 1 and 3, an upper end face of the connecting block 7 is provided with a connecting groove, a connecting screw 10 is threadedly connected in the connecting groove, and the connecting screw 10 is threadedly connected to the upper end of the rotating shaft; and a lower end of the housing 5 is threadedly connected to the connecting ring 4, or the lower end of the housing 5 is in snap-in connection with the connecting ring 4, or the lower end of the housing 5 is connected with the connecting ring 4 by means of a positioning pin.

Based on Example 1, by disassembling and assembling the connecting screw 10 in the connecting groove, the connecting block 7 can be connected with or disconnected from the rotating shaft. The housing 5 can be connected to the connecting ring 4 in various ways, which facilitates the assembly and disassembly of the housing 5 and the addition of pet food.

The above description of the present disclosure and its embodiments is not restrictive. The description in the accompanying drawings is merely one of the embodiments of the present disclosure, but is not intended to limit the actual structure. In summary, if those of ordinary skill in the art are inspired to design any structures and embodiments similar to the technical solution without creative efforts and without departing from the creative purpose of the present disclosure, they should all fall within the protection scope of the present disclosure.

What is claimed is:

1. A device for rotatably throwing pet food, comprising a bottom plate, wherein a groove is formed in an upper end face of the bottom plate, a push switch is arranged in the groove, a connecting ring is arranged behind the groove in the upper end face of the bottom plate, the connecting ring is detachably connected to a housing, and the housing is provided with a grain outlet; and a rotating shaft is rotatably connected to the bottom plate, rotation of the rotating shaft is driven by a motor, both ends of the rotating shaft are exposed from upper and lower end faces of the bottom plate, a throwing assembly is arranged at an upper end of the rotating shaft, and the rotating shaft drives the throwing assembly to rotate so as to throw pet food in the housing out of the grain outlet.

2. The device for rotatably throwing pet food according to claim 1, wherein the throwing assembly comprises a connecting block, a connecting plate, and a tapping plate, wherein the connecting block is sleeved on the upper end of the rotating shaft, the connecting plate is symmetrically arranged against a side face of the connecting block, and the tapping plate is arranged against a side face of the connecting plate.

3. The device for rotatably throwing pet food according to claim 2, wherein an upper end face of the connecting block is provided with a connecting groove, a connecting screw is threadedly connected in the connecting groove, and the connecting screw is threadedly connected to the upper end of the rotating shaft.

4. The device for rotatably throwing pet food according to claim 2, wherein the tapping plate is arranged in an inclined manner, and upper ends of the tapping plates on a same side are arranged opposite to each other.

5. The device for rotatably throwing pet food according to claim 1, wherein a plug-in slot is arranged at a lower end of the rotating shaft, and an output end of the motor is snap-fitted into the plug-in slot.

6. The device for rotatably throwing pet food according to claim 1, wherein a lower end of the housing is threadedly connected to the connecting ring.

7. The device for rotatably throwing pet food according to claim 1, wherein the lower end of the housing is in snap-in connection with the connecting ring.

8. The device for rotatably throwing pet food according to claim 1, wherein the lower end of the housing is connected with the connecting ring by means of a positioning pin.

* * * * *